United States Patent
Tanaka et al.

(10) Patent No.: US 6,738,747 B1
(45) Date of Patent: May 18, 2004

(54) METHOD AND APPARATUS FOR FORMING A PRODUCTION PLAN

(75) Inventors: Masayuki Tanaka, Yawata (JP); Satoru Yamamura, Kyoto (JP); Itsuhiro Yamada, Hirakata (JP); Kazuhiro Shintani, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/500,652

(22) Filed: Feb. 9, 2000

(30) Foreign Application Priority Data

Mar. 29, 1999 (JP) .............................. 11-087030

(51) Int. Cl.[7] ..................... G06F 17/60; G06F 19/00
(52) U.S. Cl. ..................... 705/9; 705/7; 700/95; 700/121
(58) Field of Search .................. 705/9, 7; 700/95, 700/121

(56) References Cited

U.S. PATENT DOCUMENTS

| | | | | |
|---|---|---|---|---|
| 4,958,292 A | * | 9/1990 | Kaneko et al. | 700/106 |
| 5,544,348 A | * | 8/1996 | Umeda et al. | 703/17 |
| 5,694,325 A | * | 12/1997 | Fukuda et al. | 700/121 |
| 5,745,364 A | * | 4/1998 | Togashi | 700/121 |
| 5,826,236 A | * | 10/1998 | Narimatsu et al. | 700/100 |
| 5,970,465 A | * | 10/1999 | Dietrich et al. | 700/103 |
| 5,991,732 A | * | 11/1999 | Moslares | 700/106 |
| 6,000,830 A | * | 12/1999 | Asano et al. | 700/121 |
| 6,035,293 A | * | 3/2000 | Lantz et al. | 707/1 |
| 6,041,270 A | * | 3/2000 | Steffan et al. | 700/121 |
| 6,049,742 A | * | 4/2000 | Milne et al. | 700/99 |
| 6,138,103 A | * | 10/2000 | Cheng et al. | 700/103 |
| 6,336,056 B1 | * | 1/2002 | Fujimoto et al. | 700/121 |

FOREIGN PATENT DOCUMENTS

JP           01199756 A  *  8/1989  ........... B23Q/41/08

OTHER PUBLICATIONS

Kuhnle, Hermann et al. Integration of CAPP and PPC—Interfusion Manufacturing Management, 1994, Integrated Manufactu Systems, vol. 5 No. 2 pp. 21–27. [Dialog: File 15].*

* cited by examiner

*Primary Examiner*—Tariq R. Hafiz
*Assistant Examiner*—Andre D Boyce
(74) *Attorney, Agent, or Firm*—Pearnen & Gordon LLP

(57) ABSTRACT

According to the present invention, a production plan forming apparatus is provided with a constitution wherein based on basic data necessary for forming a production plan and state data changing with time stored in a memory unit (11), an event receiving part (2) receives a change of production state as an event, a pseudo event generation part (4) generates a pseudo event (14a) at a time when it should be processed for an event of which times when it occurred and when a production indication is carried out are different, a dispatching part (3) determines a manufacturing apparatus and a production lot in connection with the event from the event (14) or the pseudo event (14a), and a formed production plan is displayed by a display unit (12).

8 Claims, 7 Drawing Sheets

METHOD AND APPARATUS FOR FORMING A PRODUCTION PLAN

BACKGROUND OF THE INVENTION

The present invention relates to a method for forming a production plan and an apparatus for forming a production plan.

Recently, with a technological innovation and a change of social structure for consumers, styles of production activities have been rapidly changing in the manufacturing industry to involve a wide variety and small number of goods or productions, short delivery time, and short life cycle. To cope with such a change of styles of production activities, systematization by computer has been more and more introduced into the manufacturing industry. In forming a production plan, it is becoming indispensable to manage automation by computer to form a production plan with high precision and a good efficiency.

In particular, a thin film formation process of semiconductors or liquid crystals or the like devices has many manufacturing processes, uses the same manufacturing apparatus for a plurality of times, or includes a complex manufacturing process repeating a plurality of similar manufacturing processes. In addition, a thin film formation process is a manufacturing process which is influenced greatly in the quality of the production lots due to the holding times of production lots and by the difference of process precisions of respective manufacturing apparatus. In such a complex manufacturing process, a lot of data are handled, and the manufacturing process have a variety of limitation items in manufacturing that should be taken into consideration in forming a production plan. Accordingly it is becoming more and more difficult for workers to form a plan with a good precision in real time manually, and to provide respective manufacturing apparatuses or automatic carrier units with proper production instructions.

Referring to FIG. 7, a production plan forming apparatus using a computer of a prior art is described as follows. FIG. 7 is a block diagram showing the constitution of a production plan forming apparatus according to a prior art.

As shown in FIG. 7, the conventional production plan forming apparatus comprises a central processing unit 101 having a computer, a memory unit 102 for storing a variety of data, an input unit 103 for inputting data necessary for forming a production plan, and a display unit 104 for displaying a formed production plan.

The central processing unit 101 has an event receiving part 105 for receiving a change of production conditions as an event such as a start and a finish of production by a manufacturing apparatus and a start and a finish of production of production lots. And the central processing unit 101 has a dispatching part 106 for indicating a production by forming a production plan.

The memory unit 102 stores basic data necessary for forming a production procedure of the production lots and a production plan including information on manufacturing apparatuses necessary for production, and condition data changing with time such as production lots and condition of the apparatus.

The central processing unit 101 collectively controls the input unit 103, the memory unit 102 and the display unit 104, and manages for forming a production plan according to a predetermined processing program by utilizing the event receiving part 105 and the dispatching part 106.

Next, the operation of the above-mentioned apparatus for forming a prior art production plan will be described in detail with reference to FIG. 7.

This apparatus for forming a production plan receives, as an event, a change of production state when the production state has got the change such as a start and a finish of production of the production lots, and a start and a stop of the operation of the manufacturing apparatus. And the apparatus for forming a production plan automatically forms as required a production plan, as well as carries out a production indication, namely production instruction with respect to the manufacturing apparatuses and production lots with a change in the production state according to the event received.

A manufacturing worker needs to carry out a production procedure different from usual case in order to reproduce the production lots, of which quality has deteriorated due to an excess of the holding time in specific manufacturing processes or is found to be a problem in the inspection process. In this case, a production procedure of this time should be indicated as a manual production.

A sampling test for the production lots is carried out at a constant interval in the lots produced. Depending on the test result, introduction control had to be carried out for the lots already produced or the lots to be produced afterwards. With respect to the process requiring such a complicated limitation, a manufacturing worker removes the lots from target number of products of the production plan and carried out the production indication completely manually.

On thin film formation processes in manufacturing semiconductors or liquid crystals, the quality of the production lots is greatly influenced by the time that production lots were held in the manufacturing process. In a conventional apparatus for forming a production plan, however, production indications are carried out only when the production state changed. Accordingly, in the manufacturing processes with restriction of the strict holding time, a time lag occurs between a time when a production indication is necessary and a time when a production indication is actually held thus causing a problem that the production lots are unnecessarily held. For example, in case a process for manufacturing needs more time than its previous process, a production indication is held so that the previous process is finished its production at the time when the subsequent process finishes its production. Thereby the holding time in the manufacturing processes was reduced.

In addition, it was practically very difficult for a manufacturing worker to carry out a production indication for a production lot exceeding the holding limitation time to be sent to a recovery process immediately, by comparing the holding time for the entire production lots and a holding limitation time that differs depending on each manufacturing process. Accordingly, in such a case, there is a problem that effective production can not be carried out due to a delay of response.

It was necessary to control the introduction of the production lot in the previous process based on the number of the production lot in process during the manufacturing process, in order to keep the holding time of the production lot within the limitation time. And controlling of the introduction of the production lot at the previous process as mentioned above was made, in order to enhance the operation rate of the manufacturing apparatus in the manufacturing process using the same manufacturing apparatus for a plurality of times, and in the manufacturing process for a similar manufacturing process repeated a plurality of times.

A conventional apparatus for forming a production plan, however, has a problem that unnecessary in-process lots are stopped at the subsequent process because production indications are sent as required to the manufacturing apparatuses which are not producing in case there is a lot which is operable for production.

A manufacturing process which carries out productions repetitively has also a problem that a manufacturing step free from a lot for producing occurs because the subsequent process differs depending on the lot to be produced.

In a conventional apparatus for forming a production plan, it is necessary to inspect production lots at a certain interval for the lots produced and to control the introduction of the lots already produced or the lots to be produced afterwards depending on the result of the inspection. In such case, in a conventional apparatus for forming a production plan, different lots are inspected depending on the turn of the lot produced, and it was necessary to examine the production lots whether they are proceeded for the next process or for the recovering process after the second inspection, depending on the result of the inspection. Accordingly, there is a problem that it takes a long time for the inspection result to be reflected in the production.

There is also a problem that, optimizing the production indication is difficult, and in some cases, re-inspection happens to be made for the production lots unnecessary in reality.

In a conventional apparatus for forming a production plan, a manufacturing worker can not make such meticulous control that according to actual state such as to stop a particular production lot in its production progress or to stop a particular manufacturing apparatus or a particular automatic production of the manufacturing process. Accordingly, there is also a problem that some production lots could be carried out many times to a manufacturing apparatus against the intention of the manufacturing worker or lots in process could not be held intentionally by the manufacturing worker.

BRIEF SUMMARY OF THE INVENTION

It is the purpose of the present invention to provide a method for forming a production plan and an apparatus for forming the same. In a complex and large-scale manufacturing process with many manufacturing apparatuses and manufacturing processes as well as similar productions repeatedly carried out, the method for forming a production plan and the apparatus for forming the same form a production plan rapidly and most suitably in consideration of limitations in each manufacturing process and carry out a production indication.

To achieve the above purpose, a method for forming a production plan according to the present invention comprises:

an event receiving process for receiving, as an event, a change of production state based on basic data necessary for forming a production procedure of production lots or a production plan having information on manufacturing apparatus necessary for production, and state data changing with time indicating state of said production lots and said manufacturing apparatus;

an event reservation process for forming event data by determining a time when an event reservation part carries out an production indication and an event generated at that time in case a time when an event occurs and a time when a production indication is carried out are different;

a pseudo event generation process for generating a pseudo event at a time when said event data is referred to a certain time interval and should be processed; and a process for carrying out a production indication by determining a production lot produced with said manufacturing apparatus by said pseudo event at a different time from a time when said event occurred, by using a dispatching part which determines a production lot to be produced with a manufacturing apparatus in connection with said event, and determines a manufacturing apparatus to produce next to a production lot in connection with said event, from said event or said pseudo event.

By means of the above-mentioned method for forming a production plan according to the present invention, an event data are formed with respect to an event of which time when the production state changed is different from the time when the production indication is carried out. And by a pseudo event generation part, a pseudo event is generated based on the event data at the time when the production indication is held. By determining the lots to be produced by the manufacturing apparatus in connection with an event using the dispatching part and by determining the manufacturing apparatus to be produced after the production lot in connection with an event, from said event or said pseudo event, a production plan is formed and a production indication is carried out. Accordingly even at a time when production state doesn't change by taking limitations in each process into consideration by the pseudo event, a production plan can be formed and a production indication can be carried out rapidly and most suitably.

In the above-mentioned constituents of the method for forming a production plan, it is desirable to further comprise:

a comparison process for comparing a holding time of entire production lots and a limitation time respectively from limitation time data with respect to a minimum time said production lots have to hold and a maximum time said production lots are able to hold in manufacturing processes in connection with production orders, and production history data having recorded a time of production of each manufacturing process of each of said production lots;

a limitation time judgment process for forming and outputting limitation time state data by judging an observance state of the limitation time based on a result of comparison in said comparison process;

a limitation event generation process for generating a limitation event with respect to a production lot where said holding time violates said limitation time;

a production route determination process for determining a production procedure of a production lot in connection with said limitation event generated from irregular flow data having recorded a production procedure of a production lot violating the limitation time and said limitation time state data; and a process for carrying out a production indication using a dispatching part immediately, in case a holding production lot violates the limitation time based on determination by said production route determination process.

According to this constitution of the method for forming a production plan, even in case the holding production lot violates the limitation time, a proper production indication can immediately be carried out.

In the above-mentioned constitution of the method for forming a production plan, it is desirable to further comprise:

an in-process work number calculation process for calculating out a production lot number being in process in said manufacturing processes from an in-process control data having recorded manufacturing processes where production in a particular production lot is stopped when a production lot number in manufacturing process in connection with a production order has reached a maximum production lot number that can be held in said manufacturing process, and in-process lot data showing positions of manufacturing processes where said production lots are in process in the production order;

an introduction lot control process for controlling an introduction to the manufacturing process relating to said production lot in accordance with said production lot number being in process and said in-process control data; and a process for carrying out a production indication for maintaining the in-process lot number in the manufacturing process within a predetermined number using the dispatching part.

According to this constitution of the method for forming a production plan, in case the production lot number in process in the manufacturing process reaches the maximum number, by controlling the introduction of the production lot of the relating manufacturing process in the manufacturing processes, a production plan can be formed and a production indication can be carried out so that the lot number in process in the manufacturing processes can be maintained properly.

In the above-mentioned constitution of the method for forming a production plan, it is desirable to further comprise:

a grouping process for forming grouping data dynamically by being related to a production lot having completed production for each manufacturing apparatus based on a predetermined rule;

a representative lot judgment process for designating a production lot representing a group of the related production lots as a representative lot from said grouping data;

a representative lot control process for determining a particular production procedure for said representative lot;

a same group control process for carrying out an introduction control to a subsequent manufacturing process depending on state of the representative lot for a production lot of the same group other than said representative lot; and a process for distinguishing a product procedure and for carrying out a production indication of the representative lot of production lots dynamically grouped using the dispatching part, and production lots of the same group, based on determination of said representative lot control process and said same group control process.

According to this constitution of the method for forming a production plan, a representative lot and other production lots are distinguished and a special production procedure is determined for the representative lot, and a production plan is formed and a production indication is carried out. By determining the subsequent process, and by carrying out the introduction control, based on production state of the representative lot with respect to the other lots than the representative lot, the representative lot of the production lots are actively grouped and other production lots are changed in the production procedure, and a production plan can be formed and a production indication can be carried out so that the introduction control can be carried out for the other production lots based on the representative lot state.

In the above-mentioned constitution of the method for forming a production plan, it is desirable to further determine an output of a production indication and for determining progress of a production lot, based on unit control data for controlling automation of a production indication for each manufacturing apparatus, process control data for controlling automation of a production indication for each production process in a production procedure, lot control data for controlling automation of lot progress for each production lot or product type, event control data for controlling automation of a production indication for each event forming a production plan, and event data from said event receiving process.

According to this constitution of the method for forming a production plan, the production plan can be formed and the production indication can be carried out based on the inputted control data, thereby it becomes possible for a manufacturing worker to give an indication for meticulous control.

A production plan forming apparatus according to the present invention comprises:

an input unit for inputting basic data necessary for forming a production procedure of production lots or a production plan having information on manufacturing apparatuses necessary for production, unit control data for controlling automation of a production indication for each manufacturing apparatus, process control data for controlling automation of a production indication for each production process in a production procedure, lot control data for controlling automation of lot progress for each production lot or product type, event control data for controlling automation of a production indication for each event forming a production plan;

a memory unit for storing each type of said data inputted from said input unit, state data changing with time indicating state of production lots and manufacturing apparatuses, event data relating to different events from a time production state changes, irregular flow data relating to a production procedure of production lots violating a limitation time, limitation time data relating to a holding time limitation of production lots in manufacturing process in connection with production orders, and production history data relating to production histories of production lots, limitation time state data relating to a limitation state by an entire lot holding time, in-process limitation data relating to a production lot number that can be in process in a manufacturing process and a manufacturing process an introduction control is carried out by that, in-process lot data relating to positions where production lots are in process, grouping data relating to production lot group related to a lot having completed in production for each manufacturing apparatus;

a central processing unit comprising; an event. receiving part for receiving an event of which production state changes, a pseudo event generation part for forming said event data and for generating a pseudo event, a holding time limitation observation part for changing a production procedure of production lots violating a holding limitation time in manufacturing process utilizing said irregular flow data, limitation time data, production history data, and limitation time state data, in-process number introduction control part for carrying out introduction limitation of production lots to said manufacturing apparatus to maintain an in-process lot number in a manufacturing process within a predetermined number utilizing said in-process control data and in-process lot data, dynamic lot group control part for distinguishing a representative lot of a production lot group grouped dynamically from a production procedure of other production lots utilizing said grouping data, an automatic planning control part for determining outputs of a production indication and for determining progress of production lots by receiving said unit control data, process control data, lot control data, event control data from the input unit, a dispatching part for carrying out a production indication by determining lots produced in said manufacturing apparatus among in-process lots; and a display unit for displaying contents and forming state of the production plan.

According to the production plan forming apparatus of the present invention, basic data necessary for forming a production plan like the information on the manufacturing apparatus necessary for production procedure of the production lot or the production are inputted from the input unit and stored in the memory unit. The event receiving part receives the change of the production state as an event, the state date is stored in the memory unit, and the dispatching part forms the production plan of a certain manufacturing apparatus relating to the event and outputs the production instruction. At this time, in case the time when the event is received and the time when the production is indicated are different from each other, the event data is stored in the memory unit by means of the pseudo event production procedure, the event is generated at the time when the production indication is carried out and the production indication can be carried out by the dispatching part.

In case there are limitations in the holding time of the production lot, the limitation time data with respect to the holding time of the production lot in the manufacturing process in connection with the production order and irregular flow data with respect to the limitation procedure the production violated the limitation time have to pass through are inputted from the input unit and stored in the memory unit. Based on this limitation time data, irregular flow data and production history data relating to the production history of the production lots, an observance state of the limitation time is judged by the holding time limitation observation part, the limitation time state data are stored in the memory unit as well as the production procedure of the production lot having violated the limitation time is changed and the production indication can be carried out by the dispatching part.

In case the introduction control is carried out by the in-process lot number in the process, the production lot number which can be in process in a manufacturing process and in-process control data with respect to the manufacturing process carrying out the introduction control by that are inputted from the input unit and stored in the memory unit. Based on this in-process control data and in-process lot data with respect to the positions where the production lots are in-process, the in-process lot number between the manufacturing processes of the subsequent processes can be calculated out by the in-process number introduction control part, it can be determined whether the introduction to the manufacturing process with respect to the event is possible or not, the production indication can be carried out by the dispatching part.

In case the production lots are grouped to be controlled dynamically, the production lots having completed the production are related for each manufacturing apparatus by the dynamic lot group control part, grouping data can be stored in the memory unit, were representative lot of the group and other production lots are distinguished from this grouping data, and the production indication can be carried out by the dispatching part by determining each production procedure.

In case a manufacturing worker controls production indication, either one type of data in the following is inputted and stored in the memory unit: the unit control data for controlling automation of the production indication to each manufacturing apparatus from the input unit, the process control data for controlling automation of the production indication for each manufacturing process according to the production procedure, the lot control data for controlling automation of lot progress for each production lot or each product type, the event control data for controlling automation of the production indication for each event forming the production plan. By determining the lot progress for each production lot and existence of the output of the production indication by the automatic planning control procedure, the production indication can be carried out only when it is necessary by the dispatching part.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

Figure 1:
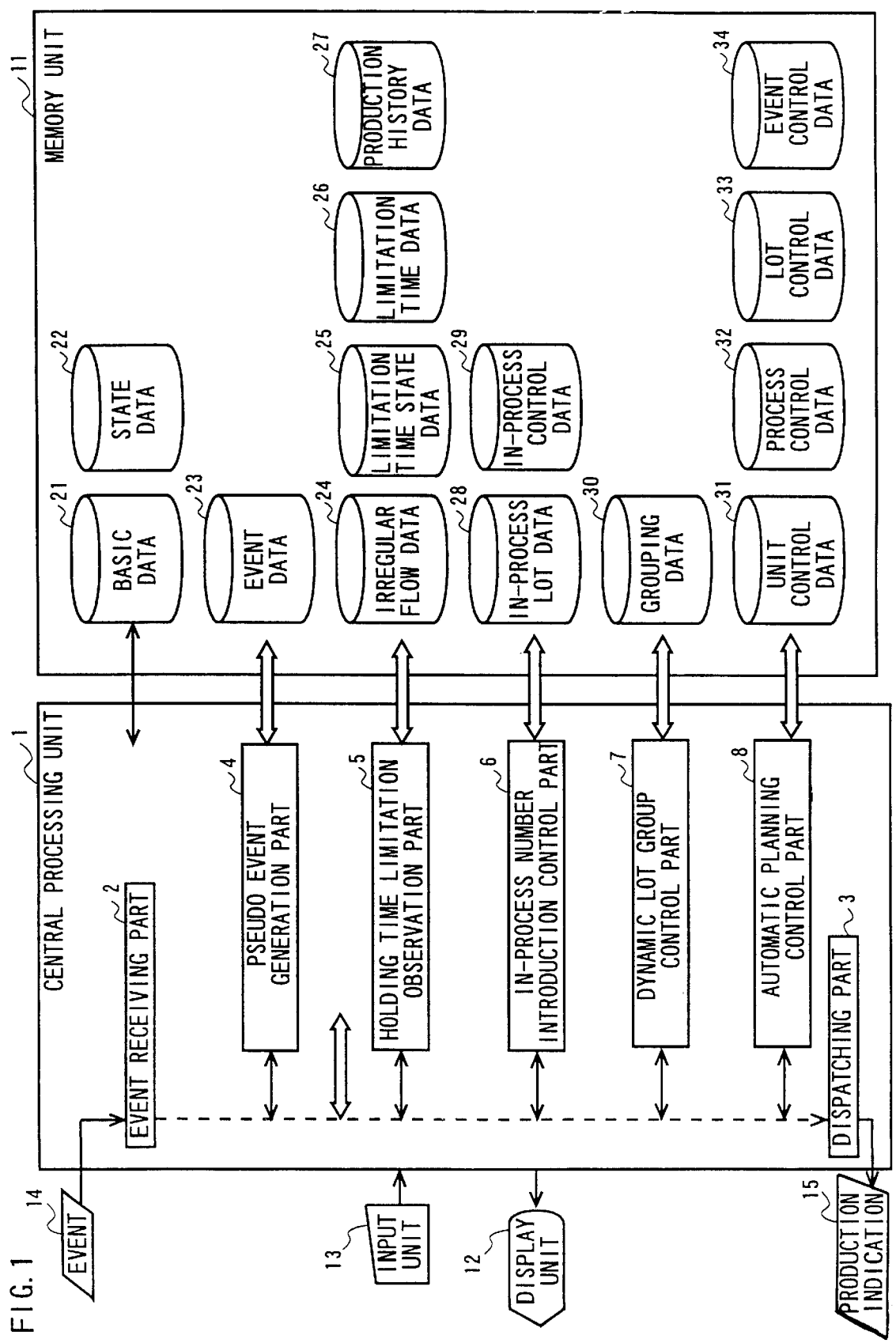
FIG. 1 is a block diagram illustrating the constitution of a production plan forming apparatus of the one embodiment according to the present invention.

A preferred embodiment of a method and production plan forming apparatus according to the present invention is described below with reference to FIGS. 1 to 6. FIG. 1 is a block diagram illustrating the constitution of one embodiment of the production plan forming apparatus according to the present invention.

As shown in FIG. 1, the production plan forming apparatus of the present embodiment comprises a central processing unit (CPU) 1 having a computer, a memory unit 11, a display unit 12 and an input unit 13.

The central processing unit 1 comprises an event receiving part 2, a dispatching part 3, a pseudo event generation part 4, a holding time limitation observation part 5, an in-process number introduction control part 6, a dynamic lot group control part 7 and an automatic planning control part 8. The central processing unit 1 is connected electrically, a -memory unit 11 for storing data necessary for forming a production plan, a display unit 12 for a displaying a formed production plan and a planning state, and an input unit 13 for inputting initially known data such as the basic data.

The event receiving part 2 receives a change of a production state as required as an event 14 and forms or renews the state data 22. The dispatching part 3 forms properly a production plan of manufacturing apparatus and a production plan of production lots in connection with events on the basis of the basic data 21 and state data 22 and outputs the production indication 15.

The pseudo event generation part 4 forms event data 23 with respect to the time when the production indication is necessary and an event, and generates a pseudo event, based on the event data 23, for carrying out production indication properly even in case an event receiving time and the time production indication carried out are different.

The holding time limitation observation part 5 observes a limitation time observance state of the holding time of an in-process lot from the limitation time data 26 and the production history data 27, and forms or renews the limitation time state data 25. In addition, the holding time limitation observation part 5 determines a production procedure of the production lots violating the limitations from irregular flow data 24 and a limitation time state data 25.

The in-process number introduction control part 6 carries out introduction control of the production lots so that in-process lot number during manufacturing processes are maintained properly by using the in-process lot data 28 and the in-process control data 29.

The dynamic lot group control part 7 groups the lots having completed production for each manufacturing apparatus and forms the grouping data 30. In addition the dynamic lot group control part 7 determined the production order of the representative lot and other production lots of the group based on the grouping data 30, and carries out an introduction control for each production lot.

The automatic planning control procedure 8 forms lot progress determined in the dispatching part 3 and a production plan, and determines the existence of the output of production indication from unit control data 31 inputted from the input unit 13 by a manufacturing worker, process control data 32, lot control data 33 and event control data 34. The above-mentioned lot progress means to put the production lot forward to the following task and more concretely (1) to determine the production path (2) to indicate so as to move to the following task.

The memory unit 11 stores the known data inputted from the input unit 13. And the memory unit 11 stores the state data 22 which is formed or renewed by the event receiving part 2, the event data 23 which is formed by the pseudo event generation part 4, the limitation time state data 25 which is formed by the holding time limitation observation part 5, and the grouping data 30 which is formed by the dynamic lot group control part 7, respectively.

The event 14 is constructed of the data or the like noticing the production start or the production stop of the production lots, the operation stop or the operation start of the manufacturing apparatus. The production indication 15 is constructed of the data to control operations for the manufacturing apparatus or the automatic carrying apparatus.

The operation of the production plan forming apparatus of the present embodiment configured as above is described with reference to FIGS. 1 to 6.

Inputted from the input unit 13 as the known data are the basic data 21 necessary for forming a production plan such as information on a production procedure of the production lots or the manufacturing apparatus necessary for the production, the state data 22 relating to the operation state or the in-process lots or the like of the initial manufacturing apparatus and irregular flow data 24 relating to a procedure in case the production procedure is different from usual. In addition inputted from the input unit 13 are the limitation time data 26 relating to the holding time of production lot in the manufacturing process and the in-process control data 29 relating to the production lot number which can be in process in the manufacturing process and relating to the manufacturing process carrying out an introduction control by the production lot number. Those inputted types of data 21, 22, 24, 26 and 29 are respectively stored in the memory unit 11.

In the central processing unit 1, whenever the production state changes the event 14 is received by the event receiving part 2 and the state data 22 of the memory unit 11 is formed or renewed. Based on the basic data 21 and the state data 22 stored in the memory unit 11, a production plan in connection with the manufacturing apparatus or the production lots where an event has occurred is formed by the dispatching part 3, and the central processing unit 1 outputs the production indication 15.

Figure 2:
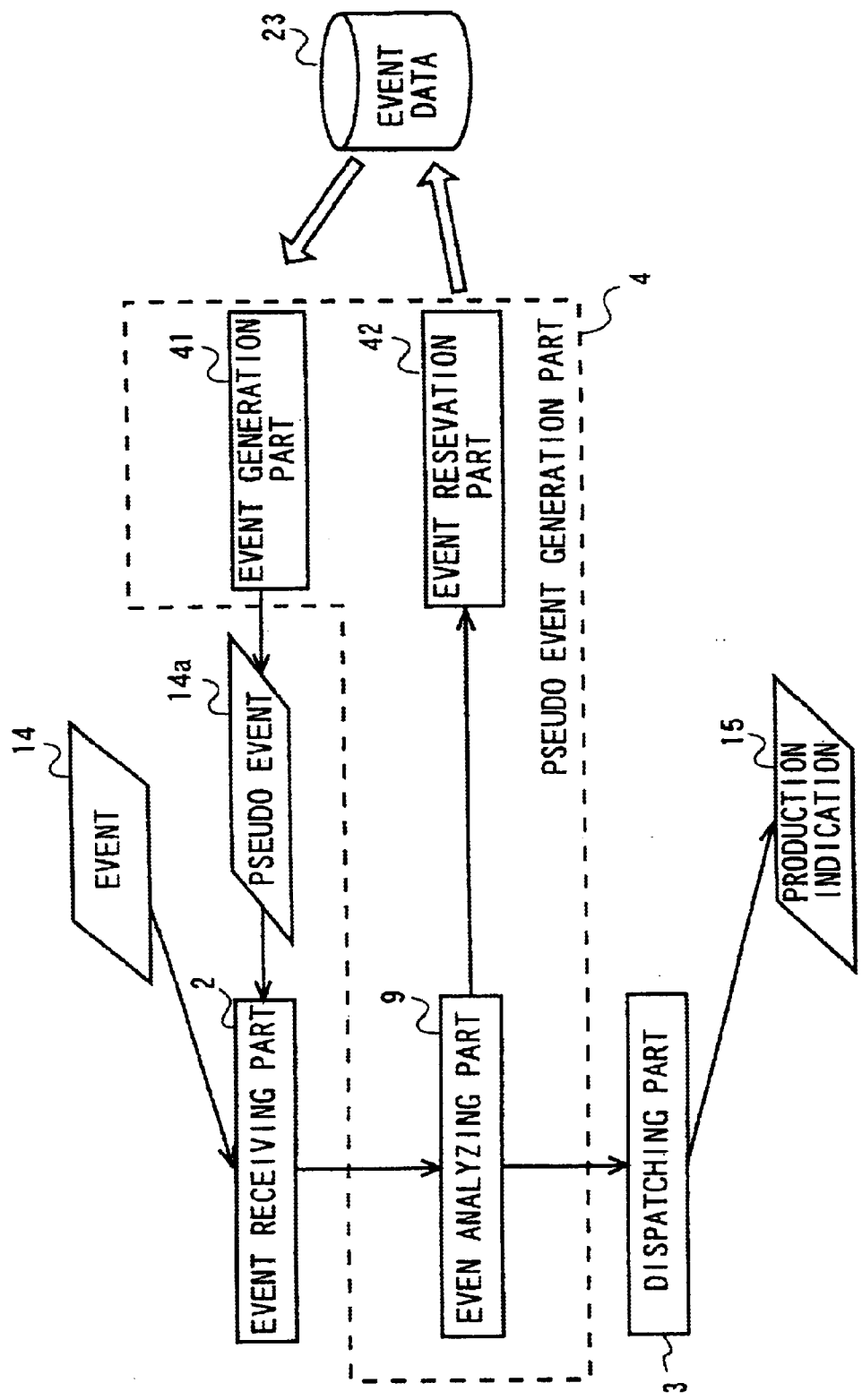
FIG. 2 is a flow chart describing the operation of a pseudo event generation part in the production plan forming apparatus of one embodiment according to the present invention.

The operation of the pseudo event generation part 4 which has characteristics of the present embodiment is described below with reference to FIG. 2. FIG. 2 is a flow chart showing the operation of the pseudo event generation part 4 of the present embodiment, showing the procedure for a proper production indication in case a time when an event occurred and a time the production indications carried out are different.

In FIG. 2, the event 14 occurs, the event 14 is received by the event receiving part 2, and then the contents of the event 14 is analyzed by the event analyzing part 9. In case the analyzed event 14 has to carry out a production indication at a different time from that of occurrence, the event reservation part 42 in the pseudo event generation 4 determines the time when the production indication is carried out and the event to be occurred at that time. And the event reservation part 42 forms the event data 23. The event generation part 41 in the pseudo event generation part 4, refers to the event data 23 at a certain time interval, and generates and outputs an pseudo event 14a with respect to the event data that has become the time for the production indication.

The event receiving part 2 receives the pseudo event 14a generated by the event generation part 41 and outputs to the dispatching part 3. In the dispatching part 3, a production plan is formed and a production indication 15 is outputted. Accordingly, the production plan forming apparatus of the present embodiment allows to carry out the production indication at a different time from the event occurrence time.

Figure 3:
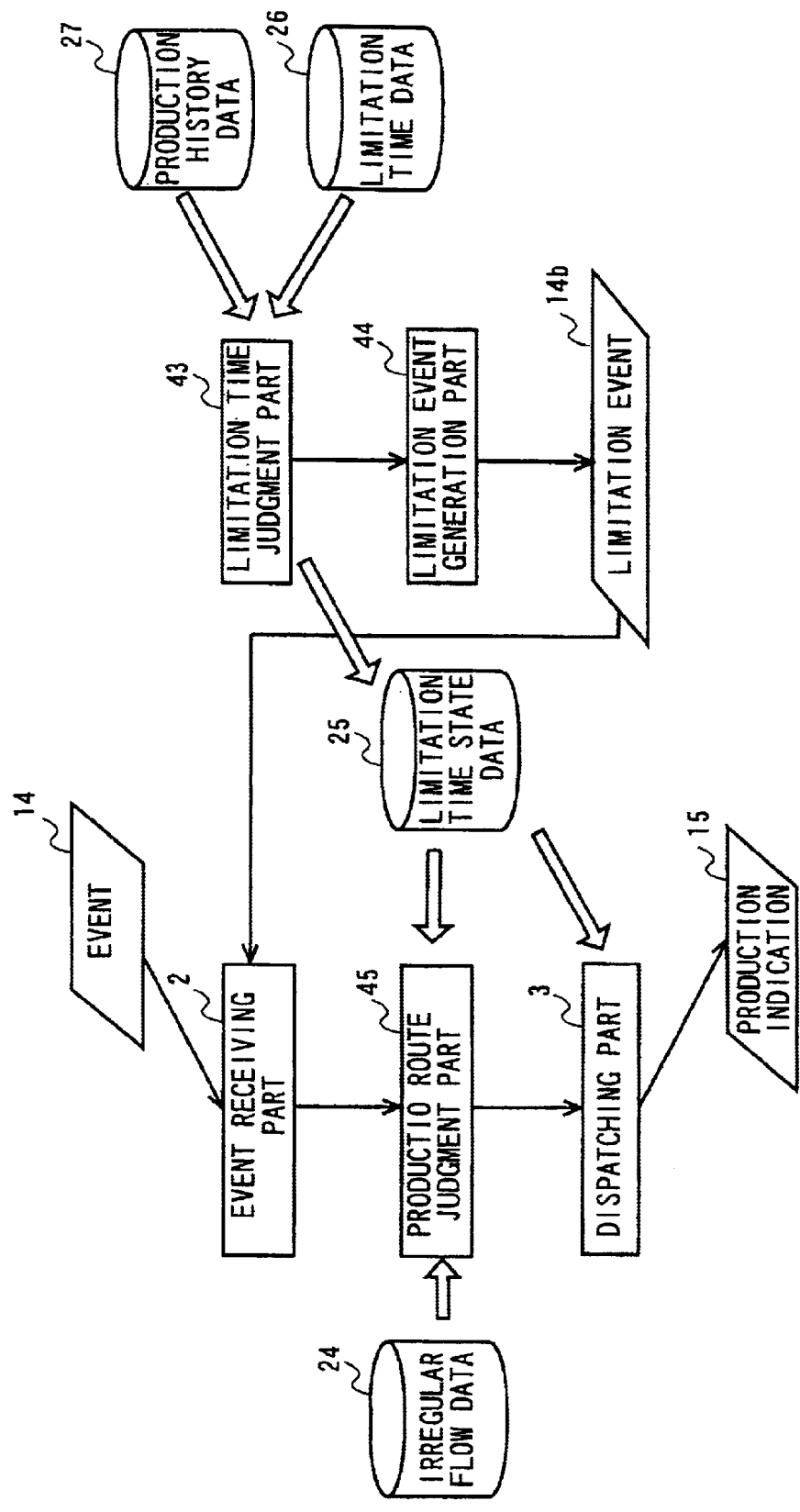
FIG. 3 is a flow chart describing the operation of a holding time limitation observation part in the production plans forming apparatus of one embodiment of the present invention.

The operation of the holding time limitation observation part 5 of the present embodiment is described below with reference to FIG. 3. FIG. 3 is a flow chart showing the operation of the holding time limitation observation part 5 of the present embodiment, showing a procedure for proper production indication at a manufacturing process subjected to the limitation by the production lot holding time.

In FIG. 3, first of all, the limitation time judgment part 43 are compares the holding time and limitation time of the entire production lots at a certain time interval from the limitation time data 26 and the production history data 27. The limitation time data 26 records the minimum time that must be held and the possible maximum time to be held in the manufacturing processes. And the production history data 27 records the data that each of the production lots has completed the production at which manufacturing process at what time. Furthermore, the limitation time judgment part 43 forms the result of judging the observance state of the limitation as the limitation time state data 25 by the above-mentioned comparison.

Next, the limitation event generation part 44 generates the limitation event 14b which carries out a production indication with respect to the production lots of which holding time exceeds the limitation time. This limitation event 14b is received by the event receiving part 2.

Based on the limitation time state data 25 and the irregular flow data 24, the production route judgment part 45 determines a production procedure of the lots having violated the limitation time. Based on this determined production procedure, a production plan is formed by the dispatching part 3 and the production indication 15 is outputted. Accordingly, the production plan forming apparatus of the present embodiment allows for a proper production indication for the lots of which holding time has violated the limitation time to be carried out as required without a delay of time.

Figure 4:
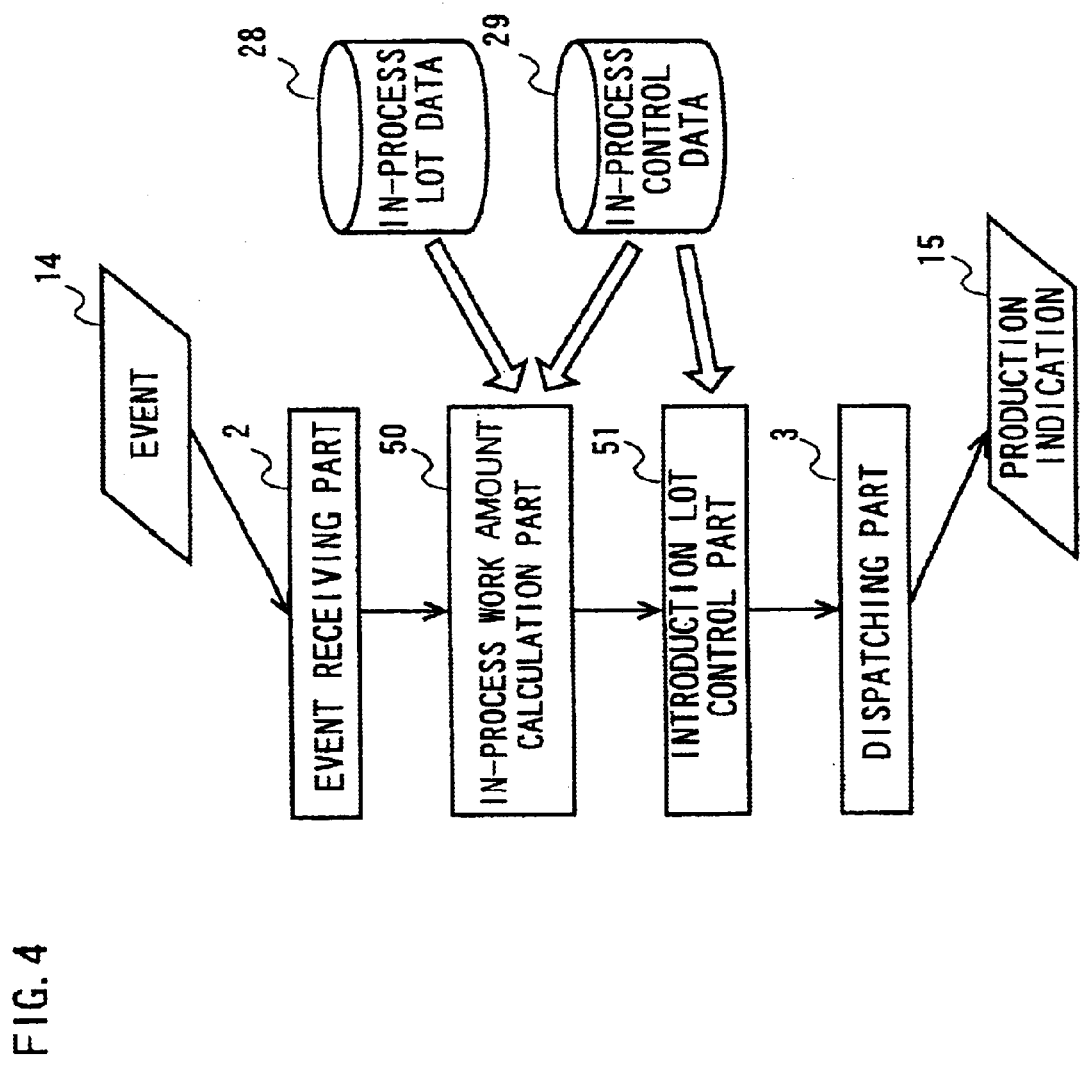
FIG. 4 is a flow chart describing the operation of an in-process number introduction control part in the production plan forming apparatus of one embodiment according to the present invention.

The operation of the in-process number introduction control part 6 of the present embodiment is described below with reference to FIG. 4. FIG. 4 is a flow chart showing the operation of the in-process number introduction control part 6 of the present embodiment showing a procedure for a production indication to maintain the in-process lot number properly in the manufacturing process.

In FIG. 4, first of all, the event receiving part 2 receives event 14. Then, by the received event 14, an in-process work number calculation part 50 calculates out the in-process lot number in the manufacturing process influencing the introduction control of the manufacturing apparatus carrying out the production indication, based on the in-process control data 29 and the in-process lot data 28 showing positions where the production lots are in process. The introduction lot control part 51 compares the in-process lot number calculated out by the in-process work number calculation part 50 and the maximum number of the production lots which can be gained from the in-process control data 29 and can be in process. With respect to the manufacturing process where the in-process lot number reached the maximum number that can be in process in the manufacturing process, the introduction lot control part 51 limits the introduction to the manufacturing apparatus. Afterwards, the introduction lot control part 51 forms the production plan and outputs production indication 15 by the dispatching part 3 with respect to the introduction lots. Accordingly, the production plan forming apparatus of the present embodiment allows to carry out the production indication which maintains the in-process lot number to the maximum number that can be in-process in the manufacturing process or less.

Figure 5:
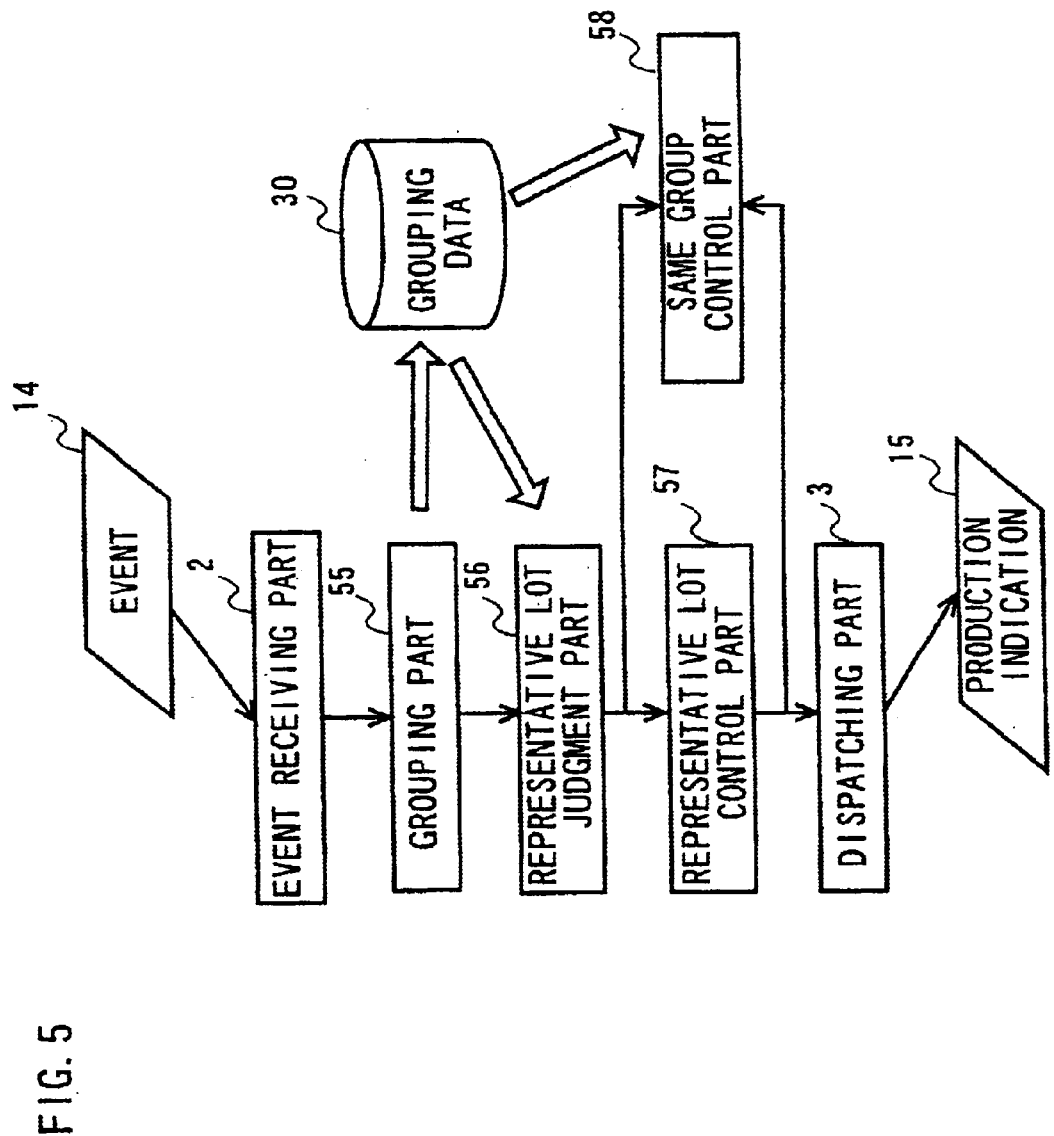
FIG. 5 is a flow chart describing the operation of a dynamic lot group control part in the production plan forming apparatus of one embodiment according to the present invention.

The operation of the dynamic lot group control part 7 of the present embodiment is described below with reference to FIG. 5. FIG. 5 is a flow chart showing the operation of the dynamic lot group control part 7 of the present embodiment. In FIG. 5, a procedure is show to carry out a production control in the group grouped by an order of the production lots having completed the production for each manufacturing apparatus.

In FIG. 5, first of all, in case the event receiving part 2 receives the event 14 of the production completion of the manufacturing apparatus, the grouping part 55 forms the grouping data 30 of the lot having completed the production and relates to the lot having completed the production in the manufacturing apparatus in the past. Then the representative lot judgment part 56 judges whether the lot having completed the production for this time is a representative or not among the production lots grouped.

In case it is a representative lot, the next production procedure is determined in the representative lot control part 57. In case it is other than the representative lot, the next production procedure is determined by referring to the production state of the representative lot in the group where the production lots belong to in the same group control part 58. According to the production procedure each lot is determined, a production plan for each production lot is formed and a production indication 15 is outputted by the dispatching part 3. Accordingly, the production plan forming apparatus of the present embodiment changes the production order of the representative lot and the other production lots. And it becomes possible to carry out a production indication allowing the introduction control of the production lot in the same group based on the production state of the representative lot.

As shown in one example, one every three lots is inspected in the inspection process for the lots produced in one manufacturing apparatus. Based on the inspection result of the lots inspected, the following two lots are determined in the production procedure. In that case, the lots having completed the production are grouped for every three lots, and by designating the first lot of each group as the representative lot, it becomes possible to control the production as mentioned above.

Figure 6:
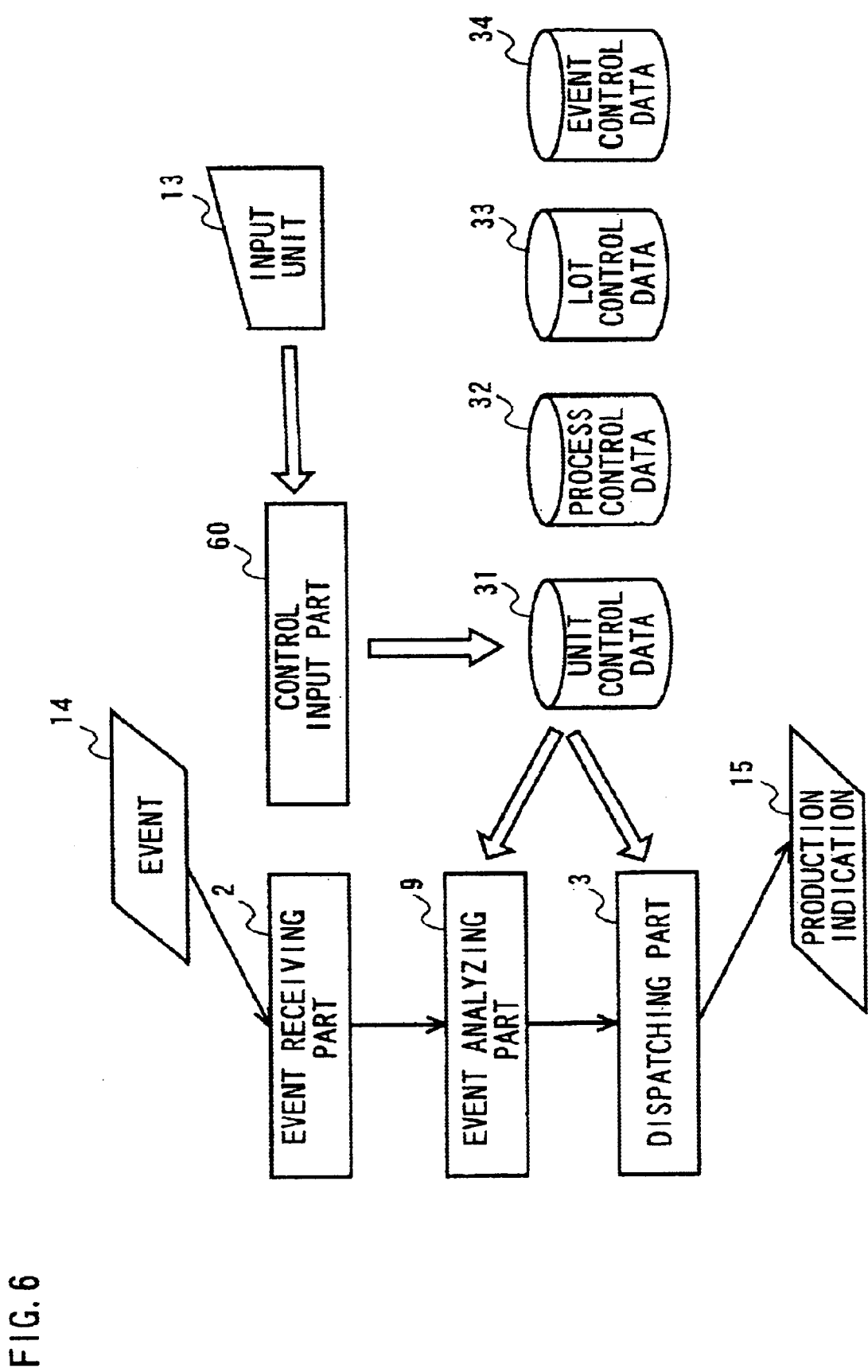
FIG. 6 is a flow chart describing an automatic planning control part in the production plan forming apparatus of one embodiment according to the present invention.
Figure 7:
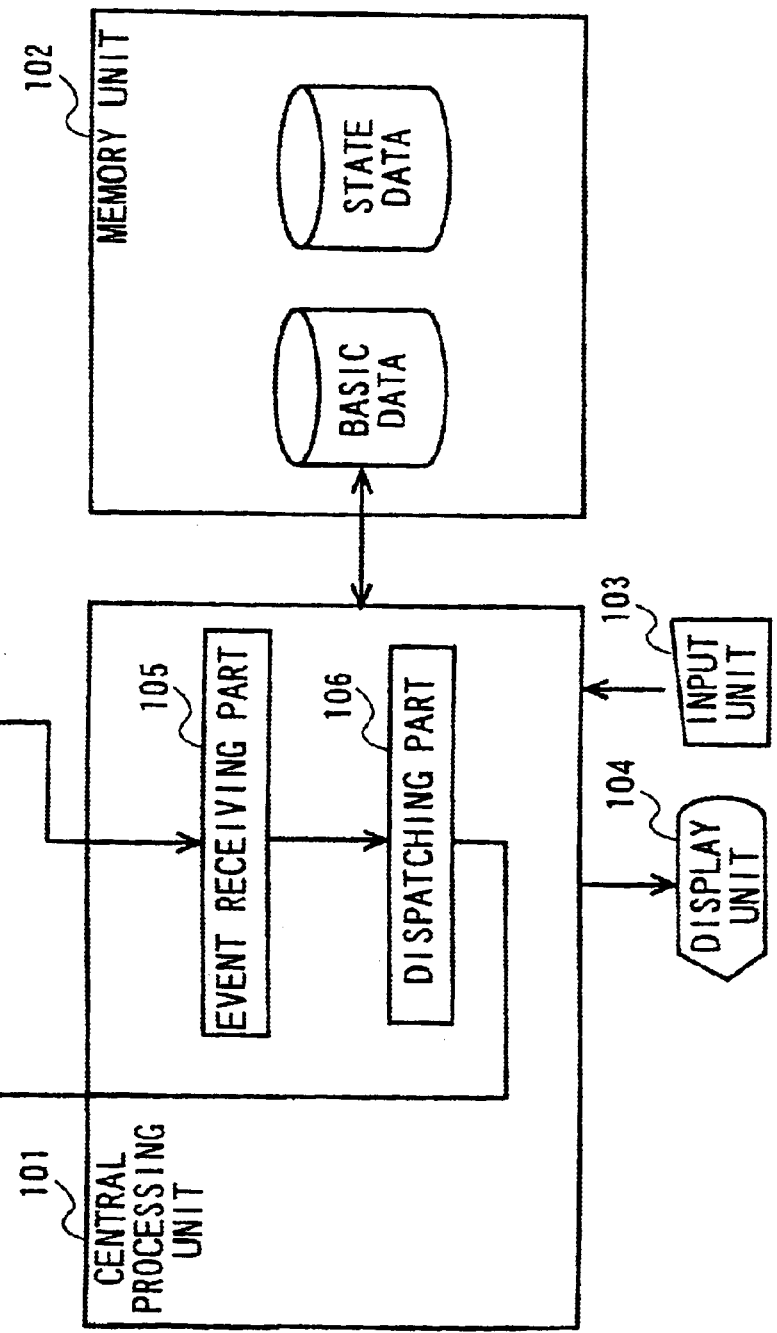
FIG. 7 is a block diagram illustrating constitution of the conventional production plan forming apparatus.

The operation of the automatic planning control part 8 of the present embodiment is described below with reference to FIG. 6. FIG. 6 is a flow chart showing the operation of the automatic planning control part 8 of the present embodiment, showing a procedure for controlling the meticulous automation of the production indication in accordance with the intention of the manufacturing worker.

In FIG. 6, in case the automation of the production indication is controlled for each manufacturing apparatus, a manufacturing worker inputs the unit control data 31 to the automatic planning control part 8 by the input unit 13. In case the automation of the product indication is controlled for each manufacturing process, process control data 32 is inputted to the automatic planning control part 8 by the input unit 13. In case a manufacturing worker controls the automation of the lot progress for each production lot and product type, the lot control data 33 is inputted to the automatic planning control part 8 by the input unit 13. Further, in case the automation of the production indication is controlled for each event forming a production plan, the event control data 34 is inputted to the automatic planning control part 8 by the input unit 13.

The types of data 31, 32, 33 and 34 inputted into the automatic planning control part 8 are, -respectively, stored in the memory unit 11 as required by the control input part 60. Afterwards, based on said types of data 31, 32, 33 and 34 are stored in the memory unit 11, whether the production plan is formed or not is determined by the event analyzing part 9. Then the dispatching part 3 determines lot progress, forms the production plan and outputs the production indication 15. Accordingly it is possible for the production plan forming apparatus of the present embodiment, to reflect the intention of a manufacturing worker in the production indication as required without changing the process procedure of the production plan.

As is obvious from the above-described embodiment, the present invention has the following effects, advantages and utilities. According to the apparatus and the method for forming a production plan of the present invention, it is possible to form a production plan which is consistent with the actual conditions of the manufacturing process rapidly and a proper production indication can be carried out concerning the production by a complex and large-scale manufacturing process which has many manufacturing apparatuses and manufacturing processes and similar production is repetitively carried out.

According to the apparatus and the method for forming a production plan of the present invention, a proper production indication can be carried out without a time lag even in case a time when the production of state has changed and a time when a production indication is necessary are different, in the case where the production lot influence greatly the quality of the production lot depending on the holding time in the manufacturing process. Accordingly it is possible to omit the unnecessary holding time of the production lot as well as to properly cope with the production lots immediately even when the holding time exceeds the limitation time so that the quality deterioration due to the holding time can be prevented.

And the apparatus and the method for forming a production plan of the present invention can control the introduction of the production lots to a particular manufacturing apparatus depending on the in-process lot number in the manufacturing process, it is possible to reduce the product lot number of which holding time exceeds the limitation time and to raise the operation ratio of the manufacturing apparatus.

Furthermore, the apparatus and the method for forming a production plan of the present invention can judge the representative lot automatically and can determine a production procedure in the case where the production lots are inspected at a certain interval and based on the inspection result the already produced lots and lots to be produced afterwards are controlled in the introduction. As a result, the method for forming the production plan of the present invention can reflect the inspection result immediately in the production and it is possible to optimize the production indication.

And the apparatus and the method for forming a production plan of the present invention, the production indication is carried out automatically and according to the intention of the manufacturing worker, automated control can be carried out for each manufacturing apparatus, for each manufacturing process and for each event. And because lot progress can be controlled for each production lot and a product type, it is possible to control the production indication meticulously corresponding to the state.

According to the production plan forming the apparatus and the method of the present invention, in a plant production having a complex and large-scale manufacturing process where there are many manufacturing apparatuses and manufacturing processes with some limitation time against the holding time in the manufacturing process and similar productions are carried out repetitively, a production plan can be planned rapidly and most suitably in consideration of the limitation of the individual manufacturing process.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. Method for forming a production plan comprising:

an event receiving process for receiving, as an event (14), a change of production state as required, based on basic data (21) necessary for forming a production procedure of production lots or a production plan having information on manufacturing apparatus necessary for production, and state data (22) changing with time indicating state of said production lots and said manufacturing apparatus;

an event analyzing process for analyzing contents of events received in said event receiving process;

an event reservation process for determining a time when a production indication is carried out and contents of an event generated at the determined time, and for forming event data on basis of the contents of the event;

a pseudo event generation process for generating a pseudo event (14*a*) for carrying out a production indication, on the basis of referring to said event data at a certain time interval, in case a production indication has to be carried out at a different time from a time when said event occurred;

a process for carrying out a production indication by determining a production lot produced with said manufacturing apparatus by said pseudo event at a different time from a time when said event occurred, by using a dispatching part (3) which determines a production lot to be produced with a manufacturing apparatus in connection with said event, and determines a manufacturing apparatus to produce next to a production lot in connection with said event, from said event or said pseudo event;

a between-process in-process number calculation process for calculating out a production lot number being in process between said manufacturing processes from an in-process control data having recorded manufacturing processes where production in a particular production lot is stopped when a production lot number between manufacturing processes in connection with a production order has reached a maximum production lot number that can be held between said manufacturing processes, and in-process lot data showing positions of manufacturing processes where said production lots are in process in the production order;

an introduction lot control process for controlling an introduction to the manufacturing process relating to said production lot in accordance with said production lot number being in process and said in-process control data; and a process for carrying out a production indication for maintaining the in-process lot number between the manufacturing processes within a predetermined number using the dispatching part.

2. Method for forming a production plan comprising:

an event receiving process for receiving, as an event (14), a change of production state as required, based on basic data (21) necessary for forming a production procedure of production lots or a production plan having information on manufacturing apparatus necessary for production, and state data (22) changing with time indicating state of said production lots and said manufacturing apparatus;

an event analyzing process for analyzing contents of events received in said event receiving process;

an event reservation process for determining a time when a production indication is carried out and contents of an event generated at the determined time, and for forming event data on basis of the contents of the event;

a pseudo event generation process for generating a pseudo event (14a) for carrying out a production indication, on the basis of referring to said event data at a certain time interval, in case a production indication has to be carried out at a different time from a time when said event occurred;

a process for carrying out a production indication by determining a production lot produced with said manufacturing apparatus by said pseudo event at a different time from a time when said event occurred, by using a dispatching part (3) which determines a production lot to be produced with a manufacturing apparatus in connection with said event, and determines a manufacturing apparatus to produce next to a production lot in connection with said event, from said event or said pseudo event;

a grouping process for forming grouping data dynamically by being related to a production lot having completed production for each manufacturing unit based on a predetermined rule;

a representative lot judgment process for designating a production lot representing a group of the related production lots as a representative lot from said grouping data;

a representative lot control process for determining a particular production procedure for said representative lot;

a same group control process for carrying out an introduction control to a following manufacturing process depending on state of the representative lot for a production lot of the same group other than said representative lot; and a process for distinguishing a product procedure and for carrying out a production indication of the representative lot of production lots dynamically grouped using the dispatching means, and production lots of the same group, based on determination of said representative lot control process and said same group control process.

3. A production plan forming apparatus comprising:

an input unit for inputting basic data (21) necessary for forming a production procedure of production lots or a production plan having information on manufacturing apparatuses necessary for production, unit control data (31) for controlling automation of a production indication for each manufacturing apparatus, process control data (32) for controlling automation of a production indication for each production process in a production procedure, lot control data (33) for controlling automation of lot progress for each production lot or product type, event control data (34) for controlling automation of a production indication for each event forming a production plan;

a memory unit (11) for storing each type of said data inputted from said input unit, state data (22) changing with time indicating state of production lots and manufacturing apparatuses, event data (23) relating to different events from a time production state changes, irregular flow data (24) relating to a production procedure of production lots violating a limitation time, limitation time data (26) relating to a holding time limitation of production lots between manufacturing processes in connection with production orders, and production history data (27) relating to production histories of production lots, limitation time state data (25) relating to a limitation state by an entire lot holding time, in-process limitation data relating to a production lot number that can be in process between manufacturing processes and a manufacturing process an introduction control is carried out by that, in-process lot data (28) relating to positions where production lots are in process, grouping data (30) relating to production lot group related to a lot having completed in production for each manufacturing apparatus;

a central processing unit (1) comprising: an event receiving part (2) for receiving an event of which production state changes, a pseudo event generation part (4) for forming said event data and for generating a pseudo event, a holding-time limitation observation part (5) for changing a production procedure of production lots violating a holding limitation time between manufacturing processes utilizing said irregular flow data, limitation time data, production history data, and limitation time state data, in-process number introduction control part (6) for carrying out introduction limitation of production lots to said manufacturing apparatus to maintain an in-process lot number between manufacturing processes within a predetermined number utilizing said in-process control data and in-process lot data, dynamic lot group control part (7) for distinguishing a representative lot of a production lot group grouped dynamically from a production procedure of other production lots utilizing said grouping data, an automatic planning control part (8) for determining outputs of a production indication and for determining progress of production lots by receiving said unit control data, process control data, lot control data, event control data from said input unit, a dispatching part (3) for carrying out a production indication by determining lots produced in said manufacturing apparatus among in-process lots; and a display unit (12) for displaying contents and forming state of the production plan:

wherein said pseudo event generation part (4) comprises: an event analyzing part (9) for analyzing contents of the event received at said event receiving part; an event reservation part (42) for forming event data (23) by determining a time when a production indication is carried out and an event generated at the determined time in case a production indication has to be carried out at a different time from a time when the analyzed event occurred; and an event generation part (41) for generating and outputting a pseudo (14a), referring to said event data at a certain time interval, with respect to the event data at the time when the production indication is carried out;

wherein, said central processing unit carries out a between-process in-process number calculation procedure for calculating out a production lot number being in process between said manufacturing processes from an in-process control data having recorded manufacturing processes where production in a particular production lot is stopped when a production lot number between manufacturing processes in connection with a production order has reached a maximum production lot number that can be held between said manufacturing processes, and in-process lot data showing positions of manufacturing processes where said production lots are in process in the production order;

an introduction lot control procedure for controlling an introduction to the manufacturing process relating to said production lot in accordance with said production lot number being in process and said in-process control data; and a procedure for carrying out a production indication for maintaining the in-process lot number between the manufacturing processes within a predetermined number using the dispatching part.

4. A production plan forming apparatus comprising:

an input unit for inputting basic data (21) necessary for forming a production procedure of production lots or a production plan having information on manufacturing apparatuses necessary for production, unit control data (31) for controlling automation of a production indication for each manufacturing apparatus, process control data (32) for controlling automation of a production indication for each production process in a production procedure, lot control data (33) for controlling automation of lot progress for each production lot or product type, event control data (34) for controlling automation of a production indication for each event forming a production plan;

a memory unit (11) for storing each type of said data inputted from said input unit, state data (22) changing with time indicating state of production lots and manufacturing apparatuses, event data (23) relating to different events from a time production state changes, irregular flow data (24) relating to a production procedure of production lots violating a limitation time, limitation time data (26) relating to a holding time limitation of production lots between manufacturing processes in connection with production orders, and production history data (27) relating to production histories of production lots, limitation time state data (25) relating to a limitation state by an entire lot holding time, in-process limitation data relating to a production lot number that can be in process between manufacturing processes and a manufacturing process an introduction control is carried out by that, in-process lot data (28) relating to positions where production lots are in process, grouping data (30) relating to production lot group related to a lot having completed in production for each manufacturing apparatus;

a central processing unit (1) comprising: an event receiving part (2) for receiving an event of which production state changes, a pseudo event generation part (4) for forming said event data and for generating a pseudo event, a holding time limitation observation part (5) for changing a production procedure of production lots violating a holding limitation time between manufacturing processes utilizing said irregular flow data, limitation time data, production history data, and limitation time state data, in-process number introduction control part (6) for carrying out introduction limitation of production lots to said manufacturing apparatus to maintain an in-process lot number between manufacturing processes within a predetermined number utilizing said in-process control data and in-process lot data, dynamic lot group control part (7) for distinguishing a representative lot of a production lot group grouped dynamically from a production procedure of other production lots utilizing said grouping data, an automatic planning control part (8) for determining outputs of a production indication and for determining progress of production lots by receiving said unit control data, process control data, lot control data, event control data from said input unit, a dispatching part (3) for carrying out a production indication by determining lots produced in said manufacturing apparatus among in-process lots; and a display unit (12) for displaying contents and forming state of the production plan;

wherein said pseudo event generation part (4) comprises: an event analyzing part (9) for analyzing contents of the event received at said event receiving part; an event reservation part (42) for forming event data (23) by determining a time when a production indication is carried out and an event generated at the determined time in case a production indication has to be carried out at a different time from a time when the analyzed event occurred; and an event generation part (41) for generating and outputting a pseudo (14a), referring to said event data at a certain time interval, with respect to the event data at the time when the production indication is carried out;

wherein, said central processing unit carries out a grouping procedure for forming grouping data dynamically by being related to a production lot having completed production for each manufacturing apparatus based on a predetermined rule;

a representative lot judgment procedure for designating a production lot representing a group of the related production lots as a representative lot from said grouping data;

a representative lot control procedure for determining a particular production procedure for said representative lot;

a same group control procedure for carrying out an introduction control to a subsequent manufacturing process depending on state of the representative lot for a production lot of the same group other than said representative lot; and a procedure for distinguishing a product procedure and for carrying out a production indication of the representative lot of production lots dynamically grouped using the dispatching part, and production lots of the same group, based on determination of said representative lot control procedure and said same group control procedure.

5. Method for forming a production plan further comprising:

an event receiving process for receiving, as an event (14), a change of production state as required, based on basic data (21) necessary for forming a production procedure of production lots or a production plan having information on manufacturing apparatus necessary for production, and state data (22) changing with time indicating state of said production lots and said manufacturing apparatus;

an event analyzing process for analyzing contents of events received in said event receiving process;

an event reservation process for determining a time when a production indication is carried out and contents of an event generated at the determined time, and for forming event data on basis of the contents of the event;

a pseudo event generation process for generating a pseudo event (14a) for carrying out a production indication, on the basis of referring to said event data at a certain time interval, in case a production indication has to be carried out at a different time from a time when said event occurred;

a process for carrying out a production indication by determining a production lot produced with said manufacturing apparatus by said pseudo event at a different time from a time when said event occurred, by using a dispatching part (3) which determines a production lot to be produced with a manufacturing apparatus in connection with said event, and determines a manufacturing apparatus to produce next to a production lot in connection with said event, from said event or said pseudo event;

a comparison process for comprising a holding time of entire production lots and a limitation time from limitation time data with respect to a minimum time said production lots have to hold and a maximum time said production lots are able to hold between manufacturing processes in connection with production orders, and production history data having recorded a time of production of each manufacturing process of each of said production lots;

a limitation time judgment process for forming and outputting limitation time state data by judging an observance state of the limitation time based on a result of comparison in said comparison process;

a limitation event generation process for generating a limitation event with respect to a production lot where said holding time violates said limitation time;

a production route determination process for determining a production procedure of a production lot in connection with said limitation event generated from irregular flow data having recorded a production procedure of a production lot violating the limitation time and said limitation time state data;

a process for carrying out a production indication using a dispatching part immediately, in case a holding production lot violates the limitation time based on determination by said production route determination process;

a between-process in-process number calculation process for calculating out a production lot number being in process between said manufacturing processes from an in-process control data having recorded manufacturing processes where production in a particular production lot is stopped when a production lot number between manufacturing processes in connection with a production order has reached a maximum production lot number that can be held between said manufacturing processes, and in-process lot data showing positions of manufacturing processes where said production lots are in process in the production order;

an introduction lot control process for controlling an introduction to the manufacturing process relating to said production lot in accordance with said production lot number being in process and said in-process control data; and a process for carrying out a production indication for maintaining the in-process lot number between the manufacturing processes within a predetermined number using the dispatching part.

6. Method for forming a production plan comprising:

an event receiving process for receiving, as an event (14), a change of production state as required, based on basic data (21) necessary for forming a production procedure of production lots or a production plan having information on manufacturing apparatus necessary for production, and state data (22) changing with time indicating state of said production lots and said manufacturing apparatus;

an event analyzing process for analyzing contents of events received in said event receiving process;

an event reservation process for determining a time when a production indication is carried out and contents of an event generated at the determined time, and for forming event data on basis of the contents of the event;

a pseudo event generation process for generating a pseudo event (14a) for carrying out a production indication, on the basis of referring to said event data at a certain time interval, in case a production indication has to be carried out at a different time from a time when said event occurred;

a process for carrying out a production indication by determining a production lot produced with said manufacturing apparatus by said pseudo event at a different time from a time when said event occurred, by using a dispatching part (3) which determines a production lot to be produced with a manufacturing apparatus in connection with said event, and determines a manufacturing apparatus to produce next to a production lot in connection with said event, from said event or said pseudo event;

a comparison process for comprising a holding time of entire production lots and a limitation time from limitation time data with respect to a minimum time said production lots have to hold and a maximum time said production lots are able to hold between manufacturing processes in connection with production orders, and production history data having recorded a time of production of each manufacturing process of each of said production lots;

a limitation time judgment process for forming and outputting limitation time state data by judging an observance state of the limitation time based on a result of comparison in said comparison process;

a limitation event generation process for generating a limitation event with respect to a production lot where said holding time violates said limitation time;

a production route determination process for determining a production procedure of a production lot in connection with said limitation event generated from irregular flow data having recorded a production procedure of a production lot violating the limitation time and said limitation time state data;

a process for carrying out a production indication using a dispatching part immediately, in case a holding production lot violates the limitation time based on determination by said production route determination process;

a grouping process for forming grouping data dynamically by being related to a production lot having completed production for each manufacturing unit based on a predetermined rule;

a representative lot judgment process for designating a production lot representing a group of the related production lots as a representative lot from said grouping data;

a representative lot control process for determining a particular production procedure for said representative lot;

a same group control process for carrying out an introduction control to a following manufacturing process depending on state of the representative lot for a production lot of the same group other than said representative lot; and a process for distinguishing a product procedure and for carrying out a production indication of the representative lot of production lots dynamically grouped using the dispatching means, and production lots of the same group, based on determination of said representative lot control process and said same group control process.

7. A production plan forming apparatus comprising:

an input unit for inputting basic data (21) necessary for forming a production procedure of production lots or a production plan having information on manufacturing apparatuses necessary for production, unit control data (31) for controlling automation of a production indication for each manufacturing apparatus, process control data (32) for controlling automation of a production indication for each production process in a production procedure, lot control data (33) for controlling automation of lot progress for each production lot or product type, event control data (34) for controlling automation of a production indication for each event forming a production plan;

a memory unit (11) for storing each type of said data inputted from said input unit, state data (22) changing with time indicating state of production lots and manufacturing apparatuses, event data (23) relating to different events from a time production state changes, irregular flow data (24) relating to a production procedure of production lots violating a limitation time, limitation time data (26) relating to a holding time limitation of production lots between manufacturing processes in connection with production orders, and production history data (27) relating to production histories of production lots, limitation time state data (25) relating to a limitation state by an entire lot holding time, in-process limitation data relating to a production lot number that can be in process between manufacturing processes and a manufacturing process an introduction control is carried out by that, in-process lot data (28) relating to positions where production lots are in process, grouping data (30) relating to production lot group related to a lot having completed in production for each manufacturing apparatus;

a central processing unit (1) comprising: an event receiving part (2) for receiving an event of which production state changes, a pseudo event generation part (4) for forming said event data and for generating a pseudo event, a holding time limitation observation part (5) for changing a production procedure of production lots violating a holding limitation time between manufacturing processes utilizing said irregular flow data, limitation time data, production history data, and limitation time state data, in-process number introduction control part (6) for carrying out introduction limitation of production lots to said manufacturing apparatus to maintain an in-process lot number between manufacturing processes within a predetermined number utilizing said in-process control data and in-process lot data, dynamic lot group control part (7) for distinguishing a representative lot of a production lot group grouped dynamically from a production procedure of other production lots utilizing said grouping data, an automatic planning control part (8) for determining outputs of a production indication and for determining progress of production lots by receiving said unit control data, process control data, lot control data, event control data from said input unit, a dispatching part (3) for carrying out a production indication by determining lots produced in said manufacturing apparatus among in-process lots; and a display unit (12) for displaying contents and forming state of the production plan;

wherein said pseudo event generation part (4) comprises: an event analyzing part (9) for analyzing contents of the event received at said event receiving part; an event reservation part (42) for forming event data (23) by determining a time when a production indication is carried out and an event generated at the determined time in case a production indication has to be carried out at a different time from a time when the analyzed event occurred; and an event generation part (41) for generating and outputting a pseudo (14a), referring to said event data at a certain time interval, with respect to the event data at the time when the production indication is carried out;

wherein, said central processing unit carries out a comparison procedure for comparing a holding time of entire production lots and a limitation time from limitation time data with respect to a minimum time said production lots have to hold and a maximum time said production lots are able to hold between manufacturing processes in connection with production orders, and production history data having recorded a time of production of each manufacturing process of each of said production lots;

a limitation time judgment procedure for forming and outputting limitation time state data by judging an observance state of the limitation time based on a result of comparison in said comparison procedure;

a limitation event generation procedure for generating a limitation event with respect to a production lot where said holding time violates said limitation time;

a production route determination procedure for determining a production procedure of a production lot in connection with said limitation event generated from irregular flow data having recorded a production procedure of a production lot violating the limitation time and said limitation time state data;

a procedure for carrying out a production indication using a dispatching part immediately, in case a holding lot violates the limitation time based on determination by said production route determination procedure;

a between-process in-process number calculation procedure for calculating out a production lot number being in process between said manufacturing processes from an in-process control data having recorded manufacturing processes where production in a particular production lot is stopped when a production lot number between manufacturing processes in connection with a production order has reached a maximum production lot number that can be held between said manufacturing processes, and in-process lot data showing positions of manufacturing processes where said production lots are in process in the production order;

an introduction lot control procedure for controlling an introduction to the manufacturing process relating to said production lot in accordance with said production lot number being in process and said in-process control data; and a procedure for carrying out a production indication for maintaining the in-process lot number between the manufacturing processes within a predetermined number using the dispatching part.

8. A production plan forming apparatus comprising:

an input unit for inputting basic data (21) necessary for forming a production procedure of production lots or a production plan having information on manufacturing apparatuses necessary for production, unit control data (31) for controlling automation of a production indication for each manufacturing apparatus, process control data (32) for controlling automation of a production indication for each production process in a production procedure, lot control data (33) for controlling automation of lot progress for each production lot or product type, event control data (34) for controlling automation of a production indication for each event forming a production plan;

a memory unit (11) for storing each type of said data inputted from said input unit, state data (22) changing with time indicating state of production lots and manufacturing apparatuses, event data (23) relating to different events from a time production state changes, irregular flow data (24) relating to a production procedure of production lots violating a limitation time, limitation time data (26) relating to a holding time limitation of production lots between manufacturing processes in connection with production orders, and production history data (27) relating to production histories of production lots, limitation time state data (25) relating to a limitation state by an entire lot holding time, in-process limitation data relating to a production lot number that can be in process between manufacturing processes and a manufacturing process an introduction control is carried out by that, in-process lot data (28) relating to positions where production lots are in process, grouping data (30) relating to production lot group related to a lot having completed in production for each manufacturing apparatus;

a central processing unit (1) comprising: an event receiving part (2) for receiving an event of which production state changes, a pseudo event generation part (4) for forming said event data and for generating a pseudo event, a holding time limitation observation part (5) for changing a production procedure of production lots violating a holding limitation time between manufacturing processes utilizing said irregular flow data, limitation time data, production history data, and limitation time state data, in-process number introduction control part (6) for carrying out introduction limitation of production lots to said manufacturing apparatus to maintain an in-process lot number between manufacturing processes within a predetermined number utilizing said in-process control data and in-process lot data, dynamic lot group control part (7) for distinguishing a representative lot of a production lot group grouped dynamically from a production procedure of other production lots utilizing said grouping data, an automatic planning control part (8) for determining outputs of a production indication and for determining progress of production lots by receiving said unit control data, process control data, lot control data, event control data from said input unit, a dispatching part (3) for carrying out a production indication by determining lots produced in said manufacturing apparatus among in-process lots; and a display unit (12) for displaying contents and forming state of the production plan;

wherein said pseudo event generation part (4) comprises: an event analyzing part (9) for analyzing contents of the event received at said event receiving part; an event reservation part (42) for forming event data (23) by determining a time when a production indication is carried out and an event generated at the determined time in case a production indication has to be carried out at a different time from a time when the analyzed event occurred; and an event generation part (41) for generating and outputting a pseudo (14a), referring to said event data at a certain time interval, with respect to the event data at the time when the production indication is carried out;

wherein, said central processing unit carries out a comparison procedure for comparing a holding time of entire production lots and a limitation time from limitation time data with respect to a minimum time said production lots have to hold and a maximum time said production lots are able to hold between manufacturing processes in connection with production orders, and production history data having recorded a time of production of each manufacturing process of each of said production lots;

a limitation time judgment procedure for forming and outputting limitation time state data by judging an observance state of the limitation time based on a result of comparison in said comparison procedure;

a limitation event generation procedure for generating a limitation event with respect to a production lot where said holding time violates said limitation time;

a production route determination procedure for determining a production procedure of a production lot in connection with said limitation event generated from irregular flow data having recorded a production procedure of a production lot violating the limitation time and said limitation time state data;

a procedure for carrying out a production indication using a dispatching part immediately, in case a holding lot violates the limitation time based on determination by said production route determination procedure;

a grouping procedure for forming grouping data dynamically by being related to a production lot having completed production for each manufacturing apparatus based on a predetermined rule;

a representative lot judgment procedure for designating a production lot representing a group of the related production lots as a representative lot from said grouping data;

a representative lot control procedure for determining a particular production procedure for said representative lot;

a same group control procedure for carrying out an introduction control to a subsequent manufacturing process depending on state of the representative lot for a production lot of the same group other than said representative lot; and a procedure for distinguishing a product procedure and for carrying out a production indication of the representative lot of production lots dynamically grouped using the dispatching part, and production lots of the same group, based on determination of said representative lot control procedure and said same group control procedure.

* * * * *